United States Patent Office 2,960,077
Patented Nov. 15, 1960

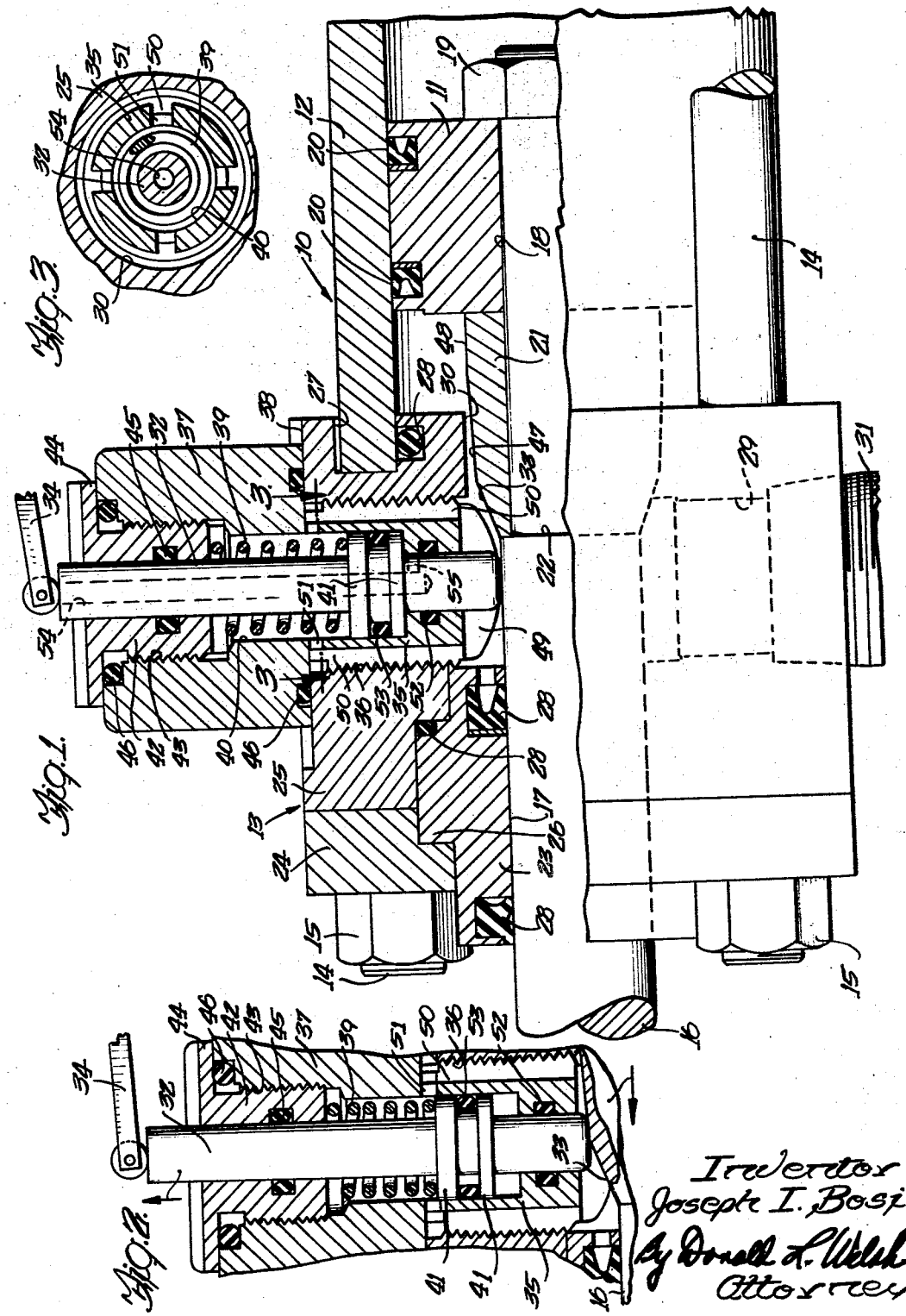

2,960,077

FLUID PRESSURE ACTUATING MECHANISM

Joseph I. Bosi, Rockford, Ill., assignor to Hydro-Line Manufacturing Co., Rockford, Ill., a corporation of Illinois Filed Apr. 22, 1959, Ser. No. 808,181

6 Claims. (Cl. 121—164)

This invention relates generally to a fluid pressure actuator of the piston and cylinder type and, more particularly, to such an actuator where the motion of the piston is utilized to operate a control device for performing some function such as reversal of the direction of piston movement.

The primary object of the invention is to utilize the motion of the piston in a novel manner so as to enable the mechanism for operating the control device to be used with cylinders of all sizes and to be located within the longitudinal confines of the cylinder thereby avoiding an increase in the length of the cylinder and thus of the space required for it.

Another object is to take advantage of the space already available within the longitudinal confines of the cylinder and, also, to adapt the mechanism for all sizes of cylinders by locating the control device operating mechanism laterally of the cylinder rather than at or beyond the end thereof.

A more detailed object is to convert the longitudinal motion of the piston to a lateral motion thereby facilitating location of the control device at the side of the cylinder.

The invention also resides in the novel construction of the control device actuating mechanism to avoid false or premature operation of the control device due to high pressure within the cylinder.

Other objects and advantages of the invention will become apparent from the following detailed description taken in connection with the accompanying drawings in which:

Figure 1 is a fragmentary side elevational view of fluid pressure actuating mechanism embodying the novel features of the present invention, some of the parts being broken away and shown in section;

Fig. 2 is a fragmentary view similar to Fig. 1 and showing the parts in different positions;

Fig. 3 is a fragmentary sectional view taken along the line 3—3 of Fig. 2.

The present invention is especially adapted for fluid pressure actuators of the type comprising a cylinder 10 having a piston 11 reciprocable within the cylinder in response to the admission and discharge of pressure fluid to and from opposite ends of the cylinder. The cylinder in this instance comprises generally a barrel 12 of cylindrical shape and two end caps 13 which are clamped against opposite ends of the barrel by tie rods 14 receiving nuts 15. Only one end cap is shown in the drawings, but it will be apparent that the cap at the other end of the barrel is of similar construction.

The piston 11 is carried by a rod 16 which reciprocates in a bore 17 in the end cap and extends from the interior of the barrel through the cap to the exterior where it is connected to a part to be actuated. In this instance, the piston is of cylindrical shape with its inner periphery telescoping closely over a cylindrical surface 18 of reduced diameter on the inner end portion of the rod. A nut 19 threaded onto a reduced end of the rod beyond this surface engages the piston to retain it on the rod. On its outer periphery, the piston is formed with four axially spaced grooves which open radially and outwardly to receive rings 20 forming fluid seals between the piston and the inner wall of the barrel. For a purpose to appear later, a sleeve 21 telescopes over the cylindrical surface 18 adjacent the piston and is clamped by the nut against a shoulder 22 at the outer end of such surface.

In the present instance, the end cap is made up of three separate parts 23, 24 and 25 including an inner sleeve 23 which is formed with the bore 17 for the piston rod 16 and with an outer peripheral flange 26 which is clamped between the other or outer two parts. The latter are generally rectangular blocks having central bores to receive the sleeve and its flange and clamped to the flange and each other by the nuts and tie rods. The inner block 25 has an axially opening annular groove 27 facing inwardly to the adjacent end of the barrel 12. Suitable seal rings 28 are interposed between the inner block 25 and the barrel, between the sleeve 23 and the inner block and between the sleeve and piston rod, respectively, to prevent the escape of pressure fluid to the exterior of the cylinder. Pressure fluid is admitted to and discharged from the bore from the barrel through one or more ports 29 extending radially through the inner block and communicating with the interior of the barrel through a counterbore 30 defined by the inner peripehry of the block and having a diameter larger than that of the piston bore 17. The outer end portion of the aperture is threaded to receive a suitable fitting 31 through which the pressure fluid is admitted to and discharged from the end cap.

Means is provided to utilize the motion of the piston 11 to operate a device for performing some control function, such as reversal of the direction of the piston. Generally, this means comprises a member 32 mounted on the end cap 13 for engagement and movement by a part 33 shiftable with the piston as the piston approaches the end of its stroke adjacent the cap. The member extends through the cap and, outside of the cylinder, engages an element such as the end of a control lever 34 which operates a device, for example, a switch (not shown) in circuits for performing the desired control function.

In accordance with the present invention, the control member 32 is constructed and mounted on the end cap 13 in a novel manner to take advantage of the space already available in the end cap so as to avoid any increase in the overall length of the cylinder and also to enable the member to be used with cylinders of small as well as large diameters. To these ends, the control member is reciprocable radially of the end cap in approximately the same plane as the inlet and outlet port 29. Also, the axial motion of the piston rod 16 is converted to radial motion of the member as the piston 11 approaches the end of its stroke adjacent the end cap. For such conversion, the part 33 movable with the piston is a cam which engages and shifts the member radially. Normally, the member is urged inwardly to an inactive position with its inner end adjacent the piston rod and in the path of the cam as shown in Fig. 1. When engaged by the cam, the member is shifted radially to an outer active position to move the operating lever 34 as shown in Fig. 2. Being located in the radial plane of the inlet port and movable transversely of the piston rod, the control member remains within the longitudinal confines of the cylinder and, therefore, does not add to its length. Moreover, it can be used with cylinders having pistons of only slightly larger diameter than the piston rod.

The control member 32 in the present instance is a cylindrical pin or plunger whose inner end portion is reciprocable within a cylinder bore of a plug 35 threaded into a radially disposed tapped aperture 36 in the inner end cap block 25, such aperture being angularly spaced from the inlet and outlet port 29. The plug is a reduced end portion of a cylindrical mounting element 37 having a larger end portion disposed exteriorly of the end cap and formed with a flat surface facing inwardly for engagement with a flat radially facing surface 38 on the end cap. The control pin is urged inwardly by a coiled spring 39 encircling the pin within a counterbore 40 in the mounting member and acting between a flange 41 on the pin and a second or outer plug 42 threaded into another counter bore 43 in the outer section of the mounting member. The second plug 42 slidably receives the outer end portion of the pin in a central bore and is formed with a radial flange 44 abutting the outer end of the mounting member. Movement of the pin inwardly under the action of the spring is limited by abutment of the flange 41 on the pin with the bottom of the first counter bore 40 in the mounting member. To prevent the flow of pressure fluid to the exterior of the cylinder, a suitable O-ring seal 45 is interposed between the pin and the outer plug. Other O-ring seals 46 are interposed between the mounting member and the inner end cap block 25 and between the mounting member and the flange 44 on the outer plug 42.

The cam 33 herein is the outer periphery of the outer end portion of the sleeve 21 which is clamped between the piston 11 and the shoulder 22 on the piston rod 16 by the nut 19. This peripheral surface merges at its outer end with the larger cylindrical surface of the piston rod and is inclined upwardly therefrom at a rather abrupt angle. At its inner end, the cam surface merges with a more gradually tapering surface 47 which, in turn, merges with a cylindrical surface 48 at the inner end portion of the sleeve. This cylindrical surface is only slightly smaller than the counterbore 30 in the end cap 13 and co-operates with the gradually tapering surface 47 to produce a cushioning action as the piston approaches the end cap. To receive the cam 33 as it engages and moves along the control pin, the inner end of the inner plug 35 on the mounting member 37 is cut away as indicated at 49 to provide a cylindrical recess.

Pressure fluid acting on the inner end of the control pin 32 tends to shift the pin radially and outwardly against the action of the spring 39 and thereby effect a premature operation of the controlled lever 34 before the cam 33 engages the pin at the end of the stroke. Such premature shifting of the pin is avoided by establishing communication between the counter bore 30 in the end cap 13 and the inner counterbore 40 in the mounting member 37 so that pressure fluid is present in the latter counter bore and acts on the outer side of the flange 41 to assist the spring and urge the pin inwardly. Such communication for equalizing the pressures on the flange and the inner end of the pin is established through passageways 50 and 51.

When the control pin 32 is in its outer position, the inner side of the flange 41 on the pin is spaced outwardly from the bottom of the inner counter bore 40 in the mounting member 37 as shown in Fig. 2. To avoid the flow of pressure fluid into such space from that counterbore in the mounting member or the counterbore 30 in the end cap 13, seals 52 and 53 are spaced along the pin and act between the inner end portion of the pin and the wall of the bore of the inner plug 35 and between the flange 41 and the wall of the counterbore 40 in the plug. In this instance, the inner seal is an O-ring 52 fitting into an inwardly opening groove in the inner plug and the outer seal is an O-ring 53 fitting into an outwardly opening groove in the flange 41 on the pin.

In spite of the seals 52 and 53, there is a tendency for fluid to leak into the space between the control pin flange 41 and the bottom of the counterbore 40 in the inner plug 35, such fluid tending to produce a dashpot action and retard the inward movement of the pin under the action of the spring 39 when the cam 33 is retracted from the inner end of the pin. To avoid such action and insure rapid operation of the pin, the space between the seals communicates with the atmosphere or exterior of the cylinder through a passageway 54. To simplify the construction, this passageway preferably is formed as an axial bore extending from the outer end of the pin and short of the inner end and connected to the exterior of the pin between the seals by a radial hole 55. This location of the passageway is made possible by forming the passageways 50 and 51 between the counterbores 30 and 40 exteriorly of the pin. Herein, the latter passageways are slots 50 opening radially and outwardly from the periphery of the inner plug 35 at angularly spaced points and extending throughout the length of the plug with their upper ends connected to the counterbore 40 in the plug through radial holes 51.

It will be apparent that, when the piston 11 and the sleeve 21 are spaced from the end cap 13 and the control pin 32 respectively, the pin will be disposed in its inner position as shown in Fig. 1 where it is urged by the spring 39. The force of the pressure fluid which acts on the inner end of the pin is counteracted by the fluid acting on the outer side of the flange 41 on the pin. As the piston approaches the end cap, the cam 33 engages the inner end of the pin and shifts the same outwardly to its active position as shown in Fig. 2 where the arrows indicate the direction of movement of the parts. The pin remains in its outer position until the cam is shifted to the right and out of engagement with the pin. The pin then shifts inwardly under the action of its spring. Such shifting is effected without delay due to accumulation of fluid within the inner end portion of the counterbore 40 in the mounting member 37 because this fluid is vented to atmosphere through the bore 54 and radial hole 55 in the pin. By virtue of its radial movement, the control pin may be located in the plane of other parts such as the inlet port 29 in the end cap 13 thereby enabling the cap to retain the same axial dimension and avoiding increases in the length of the cylinder 10.

I claim as my invention:

1. In an actuating mechanism for use with a fluid motor, the combination of a cylinder having a bore closed at one end by an end cap, a piston reciprocable in said cylinder and having a rod extending along the cylinder axis, means on said end cap defining a bore slidably receiving said piston rod and a first counterbore opening into said cylinder bore, said end cap having a radially disposed opening establishing communication between said counterbore and the exterior of said end cap, a cam mounted on said piston rod adjacent said piston and projecting radially beyond the rod, said cam moving with said rod and into said counterbore at the inner end of said opening when said piston approaches said end cap, a plug secured in said opening and having a bore communicating at its inner end with said first counterbore, means on said plug defining a second counterbore at the outer end of the bore in the plug and a third counterbore at the outer end of the second counterbore, a plunger reciprocable in said plug bore and having a flanged portion reciprocable in said second counterbore and abutting the plug at the inner end of the counterbore to limit inward movement of the plunger to a position in which the inner end of the plunger is spaced from said rod but is disposed in the path of said cam so as to be engaged by the cam and shifted radially and outwardly thereby to an active position when the cam advances into said first counterbore, a second plug secured in said third counterbore, a spring acting between said flanged portion of said plunger and said second plug to urge the plunger inwardly to said limit position thereof, seals spaced axially along said plunger and acting between the plunger and said first plug to prevent the escape of fluid under pressure past the first plug or said plunger, means defining a passageway between said first counterbore and said second counterbore to equalize the pressures in the counterbores whereby the force of said spring and the force of fluid acting on said flanged portion of said plunger resist outward movement of the plunger due to fluid pressure on its outer end and prevent such movement until the plunger is engaged by said cam, and means on said plunger defining a passageway between said bore and the exterior of said cylinder to release fluid trapped in the counterbore between said spaced seals and thereby permit rapid return of said plunger from said active to said limit position.

2. In an actuating mechanism for use with a fluid motor, the combination of a cylinder having a bore closed at one end by an end cap, a piston reciprocable in said cylinder and having a rod extending along the cylinder axis, means on said end cap defining a bore slidably receiving said piston rod and a first counterbore opening into said cylinder bore, said end cap having a radially disposed opening establishing communication between said counterbore and the exterior of said end cap, a cam mounted on said piston rod adjacent said piston and projecting radially beyond the rod, said cam moving with said rod and into said counterbore at the inner end of said opening when said piston approaches said end cap, a plug secured in said opening and having a bore communicating at its inner end with said first counterbore, means on said plug defining a second counterbore at the outer end of the bore in the plug and a third counterbore at the outer end of the second counterbore, a plunger reciprocable in said plug bore and having a flanged portion reciproable in said second counterbore and abutting the plug at the inner end of the counterbore to limit inward movement of the plunger to a position in which the inner end of the plunger is spaced from said rod but is disposed in the path of said cam so as to be engaged by the cam and shifted radially and outwardly thereby when the cam advances into said first counterbore, a second plug secured in said third counterbore, a spring acting between said flanged portion of said plunger and said second plug to urge the plunger inwardly to said limit position thereof, seals acting between said plunger and said plugs and between said end cap and said first plug to prevent the escape of fluid under pressure from said counterbore and past the first plug and said plunger, means defining a passageway between said first counterbore and said second counterbore to equalize the pressures in the counterbores whereby the force of said spring and the force of fluid acting on said flanged portion of said plunger resist outward movement of the plunger due to fluid pressure on its outer end and prevent such movement until the plunger is engaged by said cam.

3. In an actuating mechanism for use with a fluid motor, the combination of a cylinder having a bore closed at one end by an end cap, a piston reciprocable in said cylinder bore, means on said end cap defining a bore extending transversely of the axis of said cylinder and communicating at its inner end with said cylinder bore, a plunger reciprocable in said end cap bore, yieldable means acting between said end cap and said plunger and urging the plunger to an inner limit position, a part shiftable with said piston and engageable with said plunger to move the plunger outwardly against the action of said yieldable means, means on said end cap defining a counterbore aligned axially with and disposed outwardly beyond said end cap bore, a flange on said plunger reciprocable within said counterbore, means defining a passageway between said cylinder bore and said counterbore on the outer side of said flange to equalize pressures of fluid within such bore and counterbore, seals spaced along said plunger and acting respectively between the wall of said end cap bore and the plunger inwardly of said flange and between the wall of said counterbore and the flange, and means defining a passageway between the exterior of said cylinder and the portion of said counterbore between said seals.

4. In an actuating mechanism for use with a fluid motor, the combination of a cylinder having an end cap, means on said end cap defining a bore smaller than and aligned axially with the bore of said cylinder, a piston reciprocable in said cylinder bore, a rod extending through and reciprocable in said bore of said end cap and connected to said piston within said cylinder bore for reciprocation with the piston as pressure fluid is introduced to and released from said cylinder on opposite sides of the piston, said end cap having a counterbore opening into said cylinder bore, means on said end cap defining a transverse bore extending transversely of and opening at its inner end into said counterbore, a plunger reciprocable in said transverse bore and having its inner end disposed closely adjacent said rod, the outer end portion of said plunger extending exteriorly of the end cap, sealing means acting between said end cap and said plunger to prevent the escape of pressure fluid from said cylinder bore and said counterbore through said transverse bore, yieldable means acting between said end cap and said plunger and urging the latter inwardly toward said rod and into a limit position in which the inner end of the plunger is disposed adjacent the rod, and a cam carried by said rod adjacent said piston and projecting radially beyond the rod to engage said inner end of said plunger and shift the plunger radially and outwardly against the action of said yieldable means when said piston approaches the end of said bore adjacent said end cap.

5. In an actuating mechanism for use with a fluid motor, the combination of a cylinder having a bore closed at one end by an end cap, a piston reciprocable in said cylinder bore, means on said end cap defining a bore extending transversely of the axis of said cylinder and communicating at its inner end with said cylinder bore, a plunger reciprocable in said end cap bore and having its opposite ends disposed on the interior and the exterior of the end cap respectively, yieldable means acting between said end cap and said plunger to urge the plunger to an inner limit position, a part shiftable with said piston and engageable with said plunger to move the plunger outwardly against the action of said yieldable means and away from said limit position, and sealing means acting between said plunger and said end cap to prevent the escape of pressure fluid outwardly along the plunger.

6. In an actuating mechanism for use with a fluid motor, the combination of a cylinder having a bore closed at one end by a cap, a piston reciprocable within said bore, means on said cap defining a bore communicating at its inner end with said cylinder bore and at its outer end with a counterbore in the end cap, a plunger reciprocable within said end cap bore and having an outwardly projecting peripheral flange slidable in said counterbore, means defining a passageway between said counterbore and said cylinder bore to provide in the counterbore a fluid having the same pressure as in the cylinder bore and acting on said flange to urge said plunger inwardly to oppose the force of pressure fluid in said cylinder bore acting on the inner end of the plunger, yieldable means acting between said plunger and said end cap to urge the plunger inwardly to a position in which said inner end is disposed interiorly of said cylinder for engagement with and outward shifting by a part movable with said piston as the piston approaches the end cap, a first seal acting between said plunger and said end cap to prevent the flow of fluid into said counterbore from said cylinder bore along said plunger, a second seal spaced along said plunger from said first seal and acting between said flange and said end cap to prevent the flow of pressure fluid from said counterbore and toward said bore past said flange, and means on said plunger defining a passageway between the exterior of said cylinder and the periphery of the plunger at a point between said seals to release fluid trapped in the counterbore between the seals and thereby avoid a dashpot effect in the inward movement of the plunger under the action of said yieldable means.

References Cited in the file of this patent

UNITED STATES PATENTS

| | | |
|---|---|---|
| 2,366,777 | Farley et al. | Jan. 9, 1945 |
| 2,743,704 | Banker | May 1, 1956 |
| 2,789,540 | Kupka et al. | Apr. 23, 1957 |

FOREIGN PATENTS

| | | |
|---|---|---|
| 562,144 | France | Aug. 27, 1923 |